United States Patent
Schuppan

(10) Patent No.: US 7,738,147 B2
(45) Date of Patent: Jun. 15, 2010

(54) METHOD OF MONITORING AT LEAST ONE PRINTING PARAMETER OF PRINTER, METHOD OF DETERMINING AND SENDING AT LEAST ONE PRINTING PARAMETER OF A PRINTER, PRINTING SYSTEM AND PRINTER

(75) Inventor: Holger Schuppan, Bottrop (DE)

(73) Assignee: Electronics for Imaging GmbH, Ratingen (DE)

( * ) Notice: Subject to any disclaimer, the term of this patent is extended or adjusted under 35 U.S.C. 154(b) by 1214 days.

(21) Appl. No.: 10/912,240

(22) Filed: Aug. 6, 2004

(65) Prior Publication Data

US 2005/0007629 A1  Jan. 13, 2005

Related U.S. Application Data

(63) Continuation of application No. 10/416,198, filed as application No. PCT/DE01/04178 on Nov. 9, 2001, now Pat. No. 6,866,434.

(30) Foreign Application Priority Data

Nov. 11, 2000 (DE) ............................... 100 56 060

(51) Int. Cl.
G06F 3/12 (2006.01)
H04N 1/00 (2006.01)
H04N 1/46 (2006.01)

(52) U.S. Cl. .................. 358/504; 358/1.15; 358/406

(58) Field of Classification Search ............. 358/406, 358/504, 1.15
See application file for complete search history.

(56) References Cited

U.S. PATENT DOCUMENTS 4,342,052 A * 7/1982 Rackley et al. ............. 358/450
5,272,518 A * 12/1993 Vincent ...................... 356/405
5,564,845 A * 10/1996 Yamaguchi et al. ......... 400/582
5,999,761 A 12/1999 Binder et al.

FOREIGN PATENT DOCUMENTS

EP  0 575 169 A1  12/1993
EP    964 330 A2  12/1999
EP  1 003 327 A2   5/2000

* cited by examiner

Primary Examiner—Twyler L Haskins
Assistant Examiner—Fred Guillermety
(74) Attorney, Agent, or Firm—Glenn Patent Group; Michael A. Glenn

(57) ABSTRACT

A printing system having a control arrangement and at least one printer, which are connected to each other via a communications network, in which the printer comprises the following components:
- a sensor arrangement with at least one sensor for registering at least one printing parameter,
- an encoding unit coupled to the sensor arrangement for encoding a printing parameter message belonging to a printing parameter determined by the sensor arrangement,
- a data transmitting unit, which is connected to the communications network, for sending the printing parameter message, in which the control arrangement comprises the following components:
- a data receiving unit, which is connected to the communications network, for receiving the printing parameter message,
- a decoding unit for decoding the printing parameter message,
- a printing parameter monitoring unit, coupled to the decoding unit, for monitoring the printing parameter received.

23 Claims, 2 Drawing Sheets

METHOD OF MONITORING AT LEAST ONE PRINTING PARAMETER OF PRINTER, METHOD OF DETERMINING AND SENDING AT LEAST ONE PRINTING PARAMETER OF A PRINTER, PRINTING SYSTEM AND PRINTER

This application is a continuation of U.S. application Ser. No. 10/416,198, filed May 8, 2003, which was the National Stage of International Application No. PCT/DE01/04178, filed Nov. 9, 2001, which was the PCT application claiming priority to German Application 100 56 060.1, filed Nov. 11, 2000, all of which are incorporated by reference herein.

At the current time, data to be printed are increasingly transmitted in digital form over great distances with the aid of data transmission media such as telephone lines, directional radio or satellite links.

The purpose of this transmission is to print out the data transmitted in a printer as receiver.

It is the intention of the transmitter, that is to say of a transmitting arrangement, to configure the printing reproduction in the printer as receiver in such a way that it agrees as accurately as possible with the version of the transmitter, that is to say the version which is present in the transmitting arrangement.

According to the prior art, however, only confirmation of the proper reception of the data on the receiver side is provided.

However, an apparatus of this type is not suitable to ensure agreement between a printout on the receiver side and a desired printout, irrespective of the printing conditions on the receiver side.

Accordingly, the transmitting arrangement has no kind of control over the agreement between the printout on the receiver side and a printout on the transmitter side.

Even if both the transmitting arrangement and the printer use the same data, there are still various possibilities as to why the two printouts can be different from each other, for example differently calibrated printers, different printing materials, designated the printing medium below, or faults in the printout.

For this reason, it has hitherto been impossible for the transmitter to ensure agreement between a printout and a desired printout.

The invention is therefore based on the problem of monitoring a printout in an improved way via a communications network.

In a method of monitoring at least one printing parameter of a printer, the printing parameter is registered.

In the following text, a printing parameter is to be understood to mean a parameter which characterizes the print from the printer, for example the presence of printing material (of a printing medium) in the printer;

the speed and/or the direction of the transport of the printing medium in the printer;

adequate agreement of the color reproduction on the printing medium with a predefined desired color reproduction;

the homogeneity of the information printed out.

The printing parameter can also be determined from at least some of the parameters mentioned above, for example by means of processing the parameters, in order to obtain from these metaparameters, which have a compressed information content as compared with the parameters mentioned above.

The printing parameter registered is encoded to form a printing parameter message, for example in accordance with a predefined communications protocol, preferably in accordance with the Transport Control Protocol (TCP) and/or the Internet Protocol (IP).

In principle, according to the invention any desired number of printing parameters can be determined and encoded to form one or more printing parameter messages.

In a further step, the printing parameter message is transmitted by the printer to a control arrangement via a communications network, for example a fixed communications network or a mobile radio network. Alternatively, the communications network can also be a local communications network (Local Area Network, LAN). Within the context of the transmission of the printing parameter message, any desired communications protocol can be used.

After transmission has been carried out, the printing parameter message received by the control arrangement is decoded. By means of the decoding, the printing parameter contained in the printing parameter message is determined by the control arrangement and is therefore available centrally in the control arrangement.

The printing parameter is monitored by the control arrangement. The control arrangement is, for example, a central control computer, which is coupled to the printer via the communications network.

The monitoring can be carried out, for example, by a predefined desired course of the printing parameter over time being monitored. Alternatively, the monitoring can be a threshold value comparison, as a function of whose result an appropriate action is triggered.

Depending on the printing parameter, a control instruction can be generated by the control arrangement to control the printer. The control instruction can be encoded by the control arrangement to form a control instruction message, preferably in accordance with the communications protocol already used for encoding the printing parameter message. According to this configuration of the invention, the control instruction message is transmitted to the printer via the communications network. The control instruction message is received by the printer and decoded by the latter, with which message the control instruction is determined. The printer is then controlled in accordance with the control instruction determined, that is to say individual components, for example the drive motor for producing the advance of the printing medium, the printing nozzles, etc, are activated.

By means of this configuration of the invention, the transmitter of digital data, that is to say the control arrangement, is placed in the position not only of monitoring the proper reception of its transmitted printing data but also of monitoring the proper printout of the same on a printer at the receiver and even of controlling it.

According to a further configuration of the invention, the printing parameter is compared with the predefined criterion and the control instruction is generated as a function of the comparison result. For example, the color composition of the color printed on the printing medium by the printer can be controlled by means of the control arrangement, or else the printer can be calibrated, generally adjusted, with regard to further aspects.

According to a preferred configuration, the print from the printer characterized by the printing parameter is carried out on the basis of printing data which has been transmitted via the communications system by means of a transmitting arrangement. The transmitting arrangement can, in particular, have the control arrangement.

The printing data is preferably printed out by means of a further printer before being transmitted to the printer and, by using this printout, a predefined criterion for the comparison of the printout parameter is determined.

The predefined criterion preferably depends on at least one desired value, which is selected from the following group:
- a desired transport value with respect to the speed and/or the transport of the printing material in the printer;
- a desired color value with respect to the colorimetric agreement of the color reproduction on the printing material with a predefined desired reproduction; and
- a desired homogeneity value with respect to the homogeneity of the information printed out.

The comparison between the printer parameter and the predefined criterion is preferably carried out by the control arrangement. Alternatively, the comparison can also be implemented in the printer itself in the form of a computer program to be executed, and the comparison result is in this case transmitted to the control arrangement as the printing parameter.

In a method of determining and sending at least one printing parameter of a printer, the printing parameter characterizing the print from the printer, at least one printing parameter is registered. Furthermore, the printing parameter registered is encoded to form a printing parameter message, and the printing parameter message is sent to a control arrangement via a communications network.

The encoded information can be transmitted via the Internet/Intranet as communications network.

Furthermore, a printing system is provided having a control arrangement and at least one printer, which are connected to each other via a communications network, in which the printer comprises the following components:
- a sensor arrangement with at least one sensor for registering at least one printing parameter,
- an encoding unit coupled to the sensor arrangement for encoding a printing parameter message belonging to a printing parameter determined by the sensor arrangement,
- a data transmitting unit, which is connected to the communications network, for sending the printing parameter message, in which the control arrangement comprises the following components:
- a data receiving unit, which is connected to the communications network, for receiving the printing parameter message,
- a decoding unit for decoding the printing parameter message,
- a printing parameter monitoring unit, coupled to the decoding unit, for monitoring the printing parameter received.

The control arrangement can additionally comprise the following components:
- a control instruction generation unit, with which a control instruction is generated as a function of at least one printing parameter received in order to control the printer,
- the encoding unit being set up to encode a control instruction message from the control instruction, and
- a data transmitting unit, which is connected to the communications network, for sending the control instruction message.

According to a further preferred configuration, a further printer for printing out the printing data transmitted to the printer by a transmitting arrangement before it is transmitted via the communications network, and a further sensor arrangement for determining desired values by using the printout produced by the further printer are provided.

A comparison unit for comparing the desired values with the printer parameter is preferably provided.

According to a further configuration of the invention, the printer comprises the following components:
- a data receiving unit, which is connected to the communications network, for receiving the control instruction message,
- the decoding unit being set up to decode the control instruction message belonging to the control instruction, and
- a printer control unit for controlling the printer as a function of the control instruction.

Furthermore, the printer can have a printer control unit for controlling the printer in accordance with a predefined control sequence.

According to a development of the invention, a sensor control unit is provided for controlling the sensor arrangement in accordance with the predefined control sequence.

The printer control unit and the sensor control unit can be implemented jointly in a control unit.

The control unit can pick up the measured values from the sensors, preprocess them and transmit the results to the transmitter of the printing data via a suitable transmission medium.

This can be done in a way in which the printer accommodates control data on the printout (for example in a marginal region of the printing medium), which data is then measured via the sensors and is verified by the control unit or a connected computer or the transmitter itself in a desired-actual comparison.

Furthermore, the sensor arrangement can comprise at least one of the following sensors,
- at least one rotary encoder for determining the transport speed and/or the transport direction and/or the transport distance of the printing medium in the printer,
- at least one color sensor, and/or
- at least one image sensor.

According to this configuration of the invention, it is advantageous to use sensors which are already present in a commercially available printer, which achieves a considerable saving in costs.

The sensors of the sensor arrangement do not have to be fixed to the print head of the printer. They should be fixed at a point within the printer at which the printed material can move the rotary encoder and, at the same time, the color sensor can carry out color measurements and the image sensor can make image recordings.

The rotary encoder is preferably connected to the material to be printed in a suitable way, such that it is capable of measuring the direction and the speed of the movement of the said material.

Furthermore, the color sensor is set up in such a way that, by means of calorimetric measurement, it is capable of measuring the color of the material to be printed (the printing medium) at the point to be measured with sufficient accuracy (preferably by means of spectrophotometric measurement).

The image sensor can be connected to suitable optics and image evaluation optics, so that this unit is capable of examining the printed image for undesired inhomogeneities, in order in this way, for example, to detect blocked nozzles on the print head of an ink jet printer.

Also provided is a printer
- having a sensor arrangement with at least one sensor for registering at least one printing parameter, having an encoding unit coupled to the sensor arrangement for encoding a printing parameter message belonging to a printing parameter determined by the sensor arrangement, and having a data transmitting unit, which is connected to the communications network, for sending the printing parameter message.

Clearly, the invention can be seen as remote monitoring of a printout on a printer, it being possible for a control unit to be fitted to the printer which, in turn, can be coupled to a color sensor operating spectrophotometrically, to a rotary encoder and/or to an image sensor, and which has an interface in order to be monitored by a computer connected to this interface via a communications network, in the simplest case a cable, or directly via data transmission media such as a communications network or the Internet.

By means of the invention, therefore, for the first time remote monitoring of a printer, in particular with regard to the printing parameters that characterize the print, becomes possible.

By equipping a printer by means of suitable sensors, which monitor the printer in relation to material transport, printed color values and printed image, and by transmitting this data as printing parameters back to the transmitter, that is to say the control arrangement, it is now possible to monitor the agreement between a printout from the printer, which remains remote from the control arrangement, with the printout (desired printout) intended by the control arrangement.

The invention will be explained in more detail below using exemplary embodiments illustrated in the appended figures.

Figure 1:
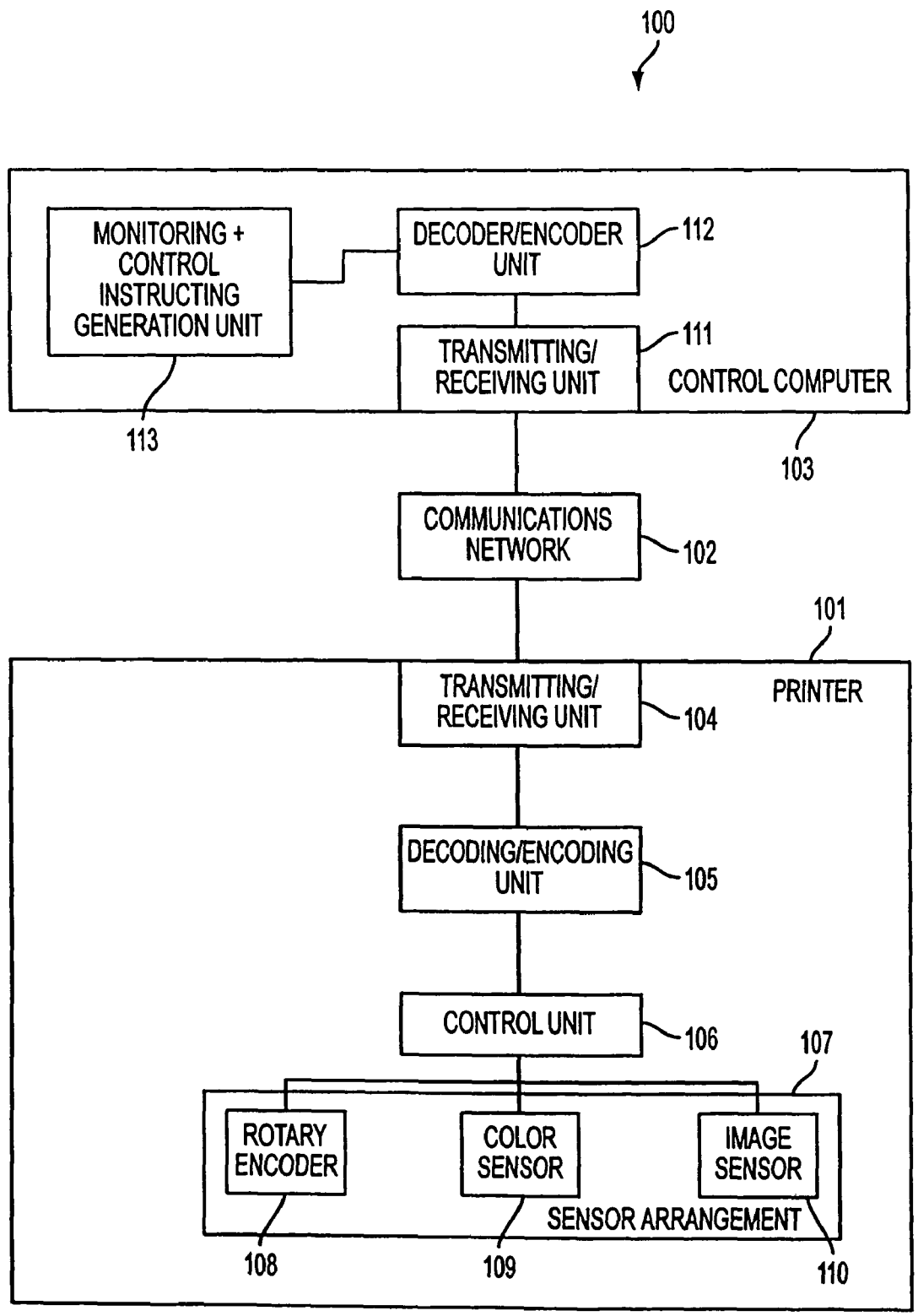
FIG. 1 shows a block diagram in which a printing system according to anyone exemplary embodiment of the invention is illustrated.

A printing system 100 comprises a printer 101, in principle any desired number of printers 101. The printer 101 is coupled to a communications network 102, to the Internet/Intranet according to this exemplary embodiment, and moreover to a control computer 103 as a control arrangement, which is likewise coupled to the communications network 102.

The printer 101 comprises
a transmitting/receiving unit 104,
a decoding/encoding unit 105 coupled to the transmitting/receiving unit 104,
a control unit 106 coupled to the decoding/encoding unit 105, and
a sensor arrangement 107 coupled to the control unit 106.

The sensor arrangement 107 comprises three sensors 108, 109, 110 respectively coupled to the control unit 106, specifically
a rotary encoder 108,
a color sensor 109, and
an image sensor 110.

In this connection, it should be pointed out that for the case in which the color sensor 109 operates sufficiently accurately, it is possible to dispense with the image sensor 110, since failure of one or more nozzles of the printer 101 can also be detected by means of a color change on the printing medium.

Alternatively, the printer 101 can be configured as a monochrome printer, so that in this case it is possible to dispense with the color sensor 109.

The rotary encoder 108 is connected in a suitable way to the material to be printed such that it can measure the direction and the speed of the movement of the material in the printer 101.

The rotary encoder 108 according to this exemplary embodiment is a commercially available component, which is set up in such a way that it is capable of generating a train of electrical signals given the presence of a rotational movement. From the type and the speed of these signals, the direction and the speed of the rotational movement are determined.

The rotary encoder 108 comprises a shaft for transmitting the rotational movement, a disc fitted to this shaft and having appropriate slots therein, and a sensor which, with the aid of a light barrier, generates an electrical pulse as such a slot passes through the light barrier.

Two light barriers are preferably arranged in a rotary encoder 108 in the printer 101 in such a way that the pulses generated by them have a phase shift. To this end, it is alternatively possible, but less preferred, for two rotary encoders to be used as well. The direction of rotation of the printing medium in the printer 101 can then be derived from the sign of the phase shift.

In order to be able to draw conclusions about the material movement with the aid of the rotary encoder 108, the shaft contained in the rotary encoder 108 is coupled to a wheel which is pressed onto the printing medium running through the printer 101.

The wheel is provided with a rubber-like covering, in order to ensure better friction with respect to the printing medium. The contact pressure is chosen such that no slip occurs between wheel and the printing medium and, at the same time, the printing medium is not hampered in its normal movement.

By means of suitable arrangement of the further sensors 109, 110 and their coupling to the wheel, it is also possible according to the invention to use the wheel to set a constant distance between the sensors and the printing medium, irrespective of the material thickness of the printing medium used.

By counting the number of pulses per unit time supplied to it by the rotary encoder 108, and by comparing the phase angle of the two signals, the control unit 106 connected to the rotary encoder 108 can obtain the following information:

the speed of the printing medium in the printer 101 (from the number of pulses per unit time and from the knowledge of the circumference of the wheel);

the direction of the material transport, that is to say of the transport of the printing medium in the printer 101 (from the phase angle of the two signals);

the distance covered, that is to say the material consumption up to this point (number of pulses and wheel circumference).

In interaction with the further sensors 109, 110 of the sensor arrangement 107, the control unit 106 can, for example, arrange for color measurements to be carried out at best when the material to be printed has just come to a standstill in the printer. In this way, a higher accuracy of the color measurement is achieved, using the color sensor 109 and the rotary encoder 108.

The color applied to the printing medium by means of the printer 101 is measured sufficiently accurately by means of spectrophotometric measurements, using the color sensor 109.

According to this exemplary embodiment, therefore, a color sensor 109 that operates spectrophotometrically is used.

The color sensor 109 that operates spectrophotometrically is set up in such a way that it is capable of measuring the intensity of the light reflected from an original, to the printing medium, at various wavelengths.

These individual intensities are then used in accordance with a rule (for example in accordance with DIN 5033) to calculate the resultant color in the XYZ color space.

For the color sensor 109 used in accordance with this exemplary embodiment, it is advantageous for said sensor to have a most compact overall form and, to the extent possible, to have its own light source for illuminating the region to be measured on the printing medium, in order to be independent of external illumination.

Furthermore, it is advantageous for the original to be located at a constant distance from the color sensor 109, in order to ensure constant measurement conditions, even if, for example, the thickness of the printing medium changes.

This may be achieved, for example, by the color sensor 109 being firmly coupled to the wheel of the rotary encoder 108 described above, said wheel running on the surface of the material of the printing medium and therefore having a defined and constant distance between the surface of the printing medium and the axis.

According to this exemplary embodiment, the image sensor 110 used is a two-dimensional array of light-sensitive cells on a CCD basis or CMOS basis, such as are also used in a digital camera, for example.

The image sensor 110 is set up to examine the printed image for undesired inhomogeneities, in order in this way, for example, to determine blocked nozzles on the print head of the printer, preferably an ink jet printer.

In conjunction with suitable optics, in this way microscopic recordings of the printed regions on the printing medium can be made.

An image evaluation unit (not illustrated) provided in the printer 101 or in the control computer 103, in conjunction with appropriately designed test patterns, can determine the following states:

- the readiness for operation or the failure of individual nozzles of the print heads of the printer 101,
- the correctness of the horizontal and vertical alignment of the print heads of the printer 101,
- the magnitude of the deviation of the horizontal and vertical alignment of the print heads of the printer 101, if there is no correct alignment of the print heads of the printer 101,
- the straight emergence of the printing medium in the printer 101.

The image evaluation can thus be carried out directly in the control unit 106 connected to the sensor arrangement 107, so that only the results of this evaluation are transmitted to the control computer 103.

Another possibility is to send the image data in complete form to the evaluation, that is to say to transmit it to the control computer 103, in compressed or uncompressed form.

The control unit 106 has the following tasks:

- control, monitoring and coordination of the sensors 108, 109, 110; this means that the control unit 106, for example by monitoring the rotary encoder 108, determines the distance through which the printing medium has moved, in order in this way to trigger, that is to say to start, a color measurement by the color sensor 108 and a recording by the image sensor 109 at equidistant, predefinable positions; likewise, by evaluating the rotary encoder signals, the control unit 106 can determine misbehavior of the printer 101, for example excessively fast and/or continuous unwinding of the printing medium;
- conditioning the results transmitted by these sensors 108, 109, 110, for example by preprocessing the data (for example filtering, averaging, statistical analysis, etc); by monitoring the color sensor 109, the control unit 106 can detect the start of the test strip on the printing medium, if said strip is encoded by means of a specific predetermined color; the same can be done via the image sensor 110, if the start of the test strip is identified by a specific pattern; the control unit 106 can reduce the data supplied by the sensors 108, 109, 110 to the quantity relevant to the user, that is to say compress said data in accordance with any desired predefined compression method. In addition, the control unit 106 can obtain new information by means of the combination of data which is generated simultaneously by two or three sensors 108, 109, 110 and received by the control unit 106, for example by means of combination (addition, subtraction, correlation, etc.) of the sensor signals respectively received.
- communication with the control computer 103 which controls the printer 101, via the decoder/encoder unit 105 and the transmitting/receiving unit 104 of the printer 101, as will be explained in more detail below; the control unit 106 communicates via an interface, according to this exemplary embodiment formed by the decoder/encoder unit 105 and the transmitting/receiving unit 104 of the printer 101, alternatively for example via a network connection, via the Internet, via a serial or parallel interface, with a connected computer, the control computer 103; the latter is capable of receiving and evaluating information from the control unit 106, of triggering specific states or actions (for example resetting, initialization) in the control unit 106, and also comparing the measured values with the desired values or with values from a previous measurement.

The control computer 103 is coupled to the communications network 102 and comprises

- a transmitting/receiving unit 111,
- a decoder/encoder unit 112 coupled to the transmitting/receiving unit 111, and
- a monitoring and control instruction generating unit 113 coupled to the decoder/encoder unit 112.

In the further text, the sequence of a print according to this exemplary embodiment of the invention will be explained with reference to FIG. 1.

Printing data to be printed is generated by the control computer 103, encoded by the decoder/encoder unit 112 in accordance with the TCP/IP protocols to form one or more printing data messages and, by means of the transmitting/receiving unit 111 of the control computer 103, are sent to the communications network 102 and thus transmitted to the printer 101 on the receiver side.

The encoded printing data messages are received by the transmitting/receiving unit 104 and decoded by the decoding/encoding unit 105 of the printer 101, the printing data to be printed being determined thereby.

Then, at least part of the printing data to be printed is printed on a printing medium guided into the printer 101.

At least part of the information printed on the printing medium and information about the printing operation itself is registered by means of the sensors 108, 109, 110 of the sensor arrangement 107, subjected to signal processing and supplied to the control unit 106. The printing parameters determined in this way are supplied to the decoding/encoding unit 105 of the printer 101, by which the printing parameters are encoded to form a printing parameter message which, by means of the transmitting/receiving unit 104 of the printer 101, is sent to the communications network 102 and thus transmitted to the control computer 103.

After the printing parameter message has been received by the control computer 103, the printing parameter message is decoded and the printing parameters are determined and analyzed, that is to say evaluated, according to this exemplary embodiment by means of a comparison with one or more desired values belonging to the printing parameter respectively taken into account.

Depending on the analysis result, that is to say in the simple case depending on the comparison result, a control instruction is generated by the monitoring and control instruction generating unit 113 and, as can be seen, represents a command for the activation of the printer 101.

The control instruction is supplied to the decoding/encoding unit 112, by which it is encoded to form a control instruction message. The control instruction message is sent to the communications network 102 by means of the transmitting/receiving unit 111 of the control computer 103, and thus transmitted to the printer 101.

The control instruction message received is decoded by means of the decoding/encoding unit 105 of the printer 101, and the control instruction determined is supplied to the control unit 106 of the printer 101.

The control unit 106 in turn controls the printer 101 on the basis of the control instruction received.

The desired value or the plurality of desired values belonging to the printing parameters, are preferably determined by the digital data transmitted to the printer 101 by the control arrangement 103 being printed out by means of a further printer (not illustrated) even before their transmission to the printer 101, as will be explained in more detail below. In relation to the communications network 102, this further printer is located on the side of the transmitter, that is to say the control arrangement 103.

The printed image produced in this way on the side of the transmitter can be measured, for example before the transmission of the printing data, by a commercially available color measuring instrument, preferably a spectrophotometer, and then converted into the data format that can be sent via the communications network 102, in particular for example in accordance with a predefined communications protocol, preferably in accordance with the Transport Control Protocol (TCP) and/or the Internet Protocol (IP).

Figure 2:
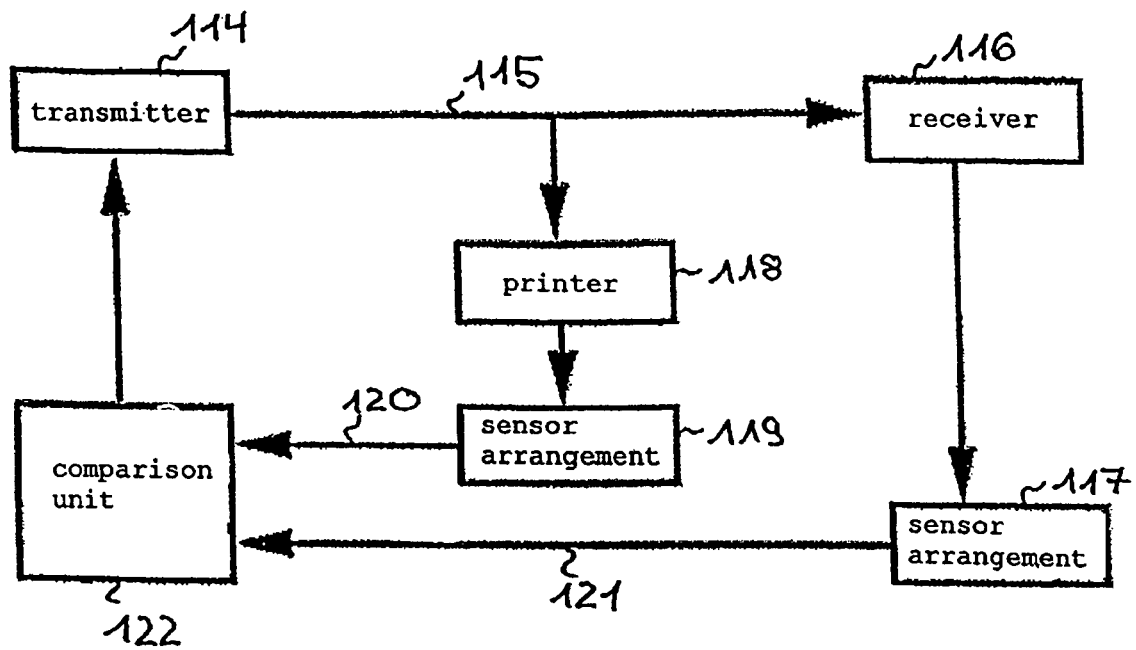
FIG. 2 shows a block diagram in which a printing system according to a further preferred exemplary embodiment is illustrated, by means of which a comparison between the printouts on the transmitter and receiver side can be implemented.

For this purpose, use is preferably made of a preferred exemplary embodiment of a printing system illustrated according to FIG. 2.

According to FIG. 2, a transmitter 114 which, in particular, can have a control arrangement corresponding to the control arrangement 103 from FIG. 1, transmits digital printing data 15 via a communications network (not illustrated) to a receiver 116, for example in the form of the printer 101 from FIG. 1. At the receiver 116, the printing data 115 received is printed out. The printout produced is evaluated by a sensor arrangement 117 that is monitored by a control unit and which can be constructed in a manner analogous to the sensor arrangement 107 from FIG. 1 that is monitored by the control unit 106, a printing parameter being produced in a manner analogous to the embodiment illustrated in FIG. 1.

In parallel with the transmission of the printing data 115 from the transmitter 114 to the receiver 116, said data is transmitted, according to FIG. 2, to a further printer 118, which is likewise coupled to a sensor arrangement 119 monitored by means of a control unit. In relation to the communications network, the further printer 118 is preferably arranged on the side of the transmitter 114.

The sensor arrangements 117, 119 preferably comprise, in a manner analogous to the embodiment illustrated in FIG. 1, a rotary encoder for determining the transport speed, transport direction and/or transport distance of the printing medium in the respective printer 116 and 118, a color sensor and an image sensor. The color sensor used is preferably a color sensor that operates spectrophotometrically. By means of the sensor arrangements 117, 119, in a manner analogous to the embodiment illustrated in FIG. 1, an evaluation of the printed images supplied by the respective printer 116 and 118 is carried out, generating corresponding sensor data 120 and 121.

According to FIG. 2, this sensor data 120 or 121 is supplied to a comparison unit 122 which, in relation to the communications network that links the transmitter 114 and receiver 116, can be arranged either on the side of the transmitter 114 or on the side of the receiver 116. In this way, a comparison of the printed result produced on the receiver side with the printed result present on the transmitter side is carried out, so that the comparison result is available to the transmitter. The sensor data 120 determined on the transmitter side by the sensor arrangement 119 can in this case be used as desired values for the comparison of the printout on the receiver side with the printout on the transmitter side, that is to say for a comparison between the printing parameters determined on the transmitter and receiver sides.

In detail, these desired values can be determined as follows for a comparison, to be carried out in order to monitor the printing parameter determined on the receiver side, with this parameter:

The desired values with respect to the direction and the speed of the transport of printing medium in the printer 116 are preferably determined in accordance with the printing system used during the design or the configuration of the sensor unit. At this time, it is already known in which direction the printing material must move and at what speed.

The desired values with respect to the colorimetric agreement of the calorimetric printing parameters to be monitored are preferably determined by the digital data to be transmitted being printed out, for example on an ink jet printing system, at the transmitter 114 or at the control arrangement 103 before being transmitted. For this purpose, the printing system 100 preferably has just the same sensors 108-110 on the transmitter side as on the receiver side. Before being sent to the receiver, the document to be sent is therefore printed out on the transmitter side, in order in this way to determine the printing parameters. For this purpose, the data is printed out as described above and measured by a commercially available color measuring instrument, preferably a spectrophotometer, and then converted into the data format that can be sent.

The desired values with respect to the homogeneity of the printout are preferably defined by means of a definition of the desired state. The desired state preferably used is a smooth area in the test pattern which is not interrupted by white lines, which can be caused by missing nozzles or nozzles not in operation. According to a further preferred embodiment, a test pattern is defined by using lines which are associated uniquely with the individual nozzles of an ink jet printer. This test pattern is then examined for the presence of the expected lines, for example by an image processing unit.

Figure 3:
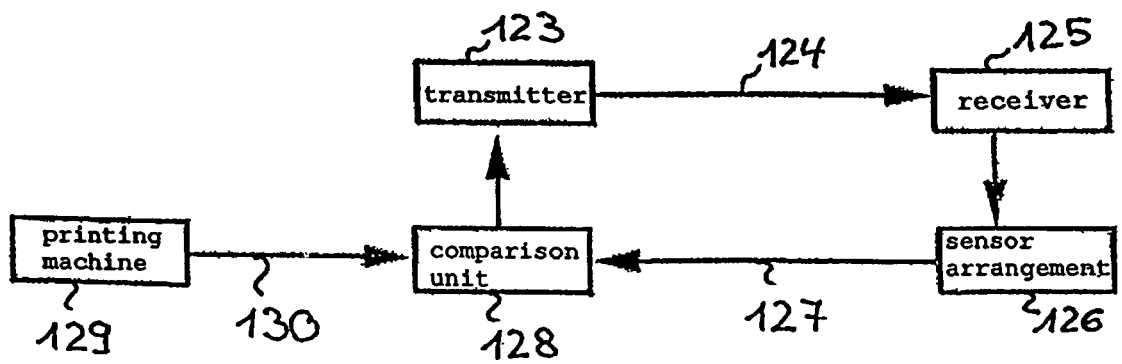
FIG. 3 shows a block diagram in which a printing system according to a further preferred embodiment is illustrated.

The embodiment of a printing system illustrated in FIG. 3 corresponds to the printing system illustrated in FIG. 2 to the extent that printing data 124 are transmitted by a transmitter 123 to a receiver 125 and, by using a printout produced on the receiver side, by means of a sensor arrangement 126, which is in turn monitored by a control unit, sensor data 127 is transmitted to a comparison unit 128. However, the desired values with regard to the colorimetric agreement, required for the comparison, are received by a printing machine 129, which supplies corresponding color measured values to the comparison unit 128.

If the printer is a system which is used for proof purposes, that is to say to simulate the print on a printing machine, the desired value with respect to the calorimetric agreement is preferably determined directly from the color behavior of this printing machine, according to FIG. 3. The color behavior of a printing machine can be registered in a known way in what is known as an ICC color profile (ICC—International Color Consortium), in that, for example, an IT8/7.3 Testform according to ISO/DIS 12640, which has been printed on this printing machine, is measured calorimetrically. Such a profile makes it possible to determine the color results which have been achieved when specific combinations of printing inks are used on this printing machine. With the aid of such a profile, therefore, it is possible to determine those calorimetric values which must be achieved during the simulation of this printing machine on an ink jet printing system. These calorimetric values can then be used as desired values with respect to the calorimetric agreement. The block diagram of an appropriate printing system is illustrated schematically in FIG. 3.

I claim:

1. A method of monitoring at least one printing parameter of a printer comprising:
    establishing a printing environment with at least one printer and a control arrangement coupled via a communications network;
    measuring one or more printing parameters of a material to be printed by the at least one printer using a rotary encoder, said measuring comprising:
        transmitting the rotational movement of the material using a rotary encoder having a shaft;
        generating a plurality of electrical pulses by rotating a disc coupled to the shaft having a plurality of slots through a light barrier; and
        deriving the one or more printing parameters from the phase shift of the plurality of electrical pulses;
    encoding the one or more printing parameter to form a printing parameter message;
    transmitting the printing parameter message using a data transmitting unit coupled to the communications network, wherein measuring one or more printing parameters of a material comprises measuring any of the direction of a material transport and printing material consumption;
    monitoring the printing parameter using the steps of:
        receiving the printing parameter message via a data receiving unit, wherein the data receiving unit is coupled to the communications network;
        decoding the printer parameter message using a decoding unit; and
    monitoring the printing parameter received using a printing parameter monitoring unit, the printing parameter monitoring unit coupled to the decoding unit;
    determining states using an image evaluation unit configured to determine the following states:
        the correctness of the horizontal alignment of a print head;
        the correctness of the vertical alignment of said print head;
        the magnitude of deviation of the horizontal alignment of said print head;
        the magnitude of deviation of the vertical alignment of said print head; and
        the straight emergence of a printing medium from said printer
    upon determining said states, printing the material based on all said states on at least one additional printing system, forming a printout; and
    determining print value criteria using the printout and a sensor arrangement, wherein the print value criteria are used in a comparison of the printing parameter.

2. The method of monitoring at least one printing parameter according to claim 1, further comprising:
    generating a control instruction as a function of at least one printing parameter received in order to control the printer,
    encoding a control instruction message from said control instruction, and
    sending said control instruction message via a data transmitting arrangement coupled connected to the communications network.

3. The method of monitoring at least one printing parameter according to claim 2, further comprising:
    receiving the control instruction message via a data receiving unit in the printer;
    decoding the control instruction message via a decoding unit in the printer, forming a decoded control instruction; and
    controlling the printer as a function of the decoded control instruction.

4. The method of monitoring at least one printing parameter according to claim 3, further comprising using a predefined control sequence for controlling the printer as a function of the decoded control instruction.

5. The method of monitoring at least one printing parameter according to claim 1, further comprising comparing the desired values with the printing parameter being provided.

6. The method of monitoring at least one printing parameter according to claim 1, further comprising controlling the rotary encoder with a sensor control unit in accordance with a predefined control sequence.

7. A method of monitoring at least one printing parameter of a printer, comprising:
    providing a printer coupled with a control arrangement via a communications network;
    registering at least one printing parameter using a color sensor that operates spectrophotometrically;
    encoding the printing parameter using an encoding unit coupled to the color sensor, forming a printing parameter message;
    transmitting the printing parameter message using a data transmitting unit, wherein the data transmitting unit is coupled to the communications network;
    receiving, decoding and monitoring the printing parameter message using the control arraignment, further comprising:
        receiving the printing parameter message with a data receiving unit coupled to the communications network;
        decoding the printing parameter message; and
        monitoring the printing parameter received;
    determining states using an image evaluation unit configured to determine the following states:
        the correctness of the horizontal alignment of a print head;
        the correctness of the vertical alignment of said print head;
        the magnitude of deviation of the horizontal alignment of said print head;

the magnitude of deviation of the vertical alignment of said print head; and the straight emergence of a printing medium from said printer;

upon determining said states, printing out the printing data based on all said states on at least one additional printer before it is transmitted via the communications network, wherein said at least one additional printer comprises at least one additional sensor arrangement; and determining desired values using said at least one additional sensor arrangement using the printout produced by said at least one additional printer, wherein a predetermined criterion is determined for a comparison of the printing parameter.

8. The method of monitoring at least one printing parameter according to claim 7, further comprising:

generating a control instruction as a function of at least one printing parameter received in order to control the printer, encoding a control instruction message from said control instruction, and sending said control instruction message via a data transmitting arrangement coupled connected to the communications network.

9. The method of monitoring at least one printing parameter according to claim 8, said transmitting arrangement comprising the control arrangement.

10. The method of monitoring at least one printing parameter according to claim 7, further comprising comparing the desired values with the printing parameter being provided.

11. The method of monitoring at least one printing parameter according to claim 7, further comprising:

receiving the control instruction message via a data receiving unit in the printer;

decoding the control instruction message via a decoding unit in the printer, forming a decoded control instruction; and controlling the printer as a function of the decoded control instruction.

12. The method of monitoring at least one printing parameter according to claim 7, further comprising using a predefined control sequence for controlling the printer as a function of the decoded control instruction.

13. The method of monitoring at least one printing parameter according to claim 7, further comprising configuring the color sensor is configured with a light source to illuminate a region of a printing medium to be measured.

14. The method of monitoring at least one printing parameter according to claim 7, further comprising configuring the color sensor at a constant distance from a printing medium to be measured.

15. A method of monitoring at least one printing parameter of a printer comprising:

providing a printing environment having at least one printer and a control arrangement coupled via a communications network;

examining a printed image for undesired inhomogeneities using a image sensor, forming at least one printing parameter;

encoding the printing parameter using an encoding unit coupled to the image sensor, forming a printing parameter message, transmitting the printing parameter message using a data transmitting unit, which is coupled to the communications network, said transmitting comprising:

receiving the printing parameter message with a data receiving unit coupled to the communications network;

decoding the printing parameter message; and monitoring the printing parameter received;

determining states using an image evaluation unit configured to determine the following states:

the correctness of the horizontal alignment of a print head;

the correctness of the vertical alignment of said print head;

the magnitude of deviation of the horizontal alignment of said print head;

the magnitude of deviation of the vertical alignment of said print head; and the straight emergence of a printing medium from said printer;

upon determining said states, printing out the printing data based on all said states on at least one additional printer before it is transmitted via the communications network; and determining desired values using at least one additional sensor arrangement using the printout produced by said at least one additional printer, wherein a predetermined criterion is determined for a comparison of the printing parameter.

16. The method of monitoring at least one printing parameter according to claim 15, further comprising:

generating a control instruction as a function of at least one printing parameter received in order to control the printer, encoding a control instruction message from said control instruction, and sending said control instruction message via a data transmitting arrangement coupled connected to the communications network.

17. The method of monitoring at least one printing parameter according to claim 16, said transmitting arrangement comprising the control arrangement.

18. The method of monitoring at least one printing parameter according to claim 15, further comprising comparing the desired values with the printing parameter being provided with a comparison unit.

19. The method of monitoring at least one printing parameter according to claim 15, further comprising:

receiving the control instruction message via a data receiving unit in the printer;

decoding the control instruction message via a decoding unit in the printer, forming a decoded control instruction; and controlling the printer as a function of the decoded control instruction.

20. The method of monitoring at least one printing parameter according to claim 15, further comprising controlling the printer in accordance with a predefined control sequence with a printer control unit.

21. The method of monitoring at least one printing parameter according to claim 15, the image sensor comprising a two-dimensional array of light sensitive cells.

22. The method of monitoring at least one printing parameter according to claim 15, the image sensor comprising a two-dimensional array of CCD sensors.

23. The method of monitoring at least one printing parameter according to claim 15, the image sensor comprising a two-dimensional array of CMOS sensors.

* * * * *